Oct. 2, 1962 E. G. WAGNER 3,056,552
ASYNCHRONOUS PARALLEL ADDER DERIVING INTERMEDIATE SUMS
AND CARRIES BY REPEATED ADDITIONS AND MULTIPLICATIONS
Filed Jan. 28, 1959 3 Sheets-Sheet 1

INVENTOR
Eric G. Wagner

BY Sughrue, Rothwell, Mion, and Zinn
ATTORNEYS

INVENTOR
Eric G. Wagner
BY Sughrue, Rothwell, Mion and Zinn
ATTORNEYS

Oct. 2, 1962 E. G. WAGNER 3,056,552

ASYNCHRONOUS PARALLEL ADDER DERIVING INTERMEDIATE SUMS AND CARRIES BY REPEATED ADDITIONS AND MULTIPLICATIONS

Filed Jan. 28, 1959 3 Sheets-Sheet 3

INVENTOR
Eric G. Wagner

BY Sughrue, Rothwell, Mion and Zinn
ATTORNEYS

United States Patent Office 3,056,552

Patented Oct. 2, 1962

3,056,552

ASYNCHRONOUS PARALLEL ADDER DERIVING INTERMEDIATE SUMS AND CARRIES BY REPEATED ADDITIONS AND MULTIPLICATIONS

Eric G. Wagner, New York, N.Y., assignor to International Business Machines Corporation, New York, N.Y., a corporation of New York

Filed Jan. 28, 1959, Ser. No. 789,607
10 Claims. (Cl. 235—175)

This invention relates to binary adders, subtracters, accumulators and the like and more particularly to such devices which function in accordance with the following algorithm.

In accordance with the algorithm, given two N-bit binary numbers A and B with bits $A_n \ldots A_2, A_1$ and $B_n \ldots B_2, B_1$ where $A_1$ and $B_1$ are the least significant bits, the sum thereof C may be formed in the following manner:

(1) Form the sum mod 2 of the corresponding bits of A and B. This is the intermediate sum ($I_s$).

(2) Form the product mod 2 of the corresponding bits of A and B and shifted one position to the left, making the least significant bit 0. This is the intermediate carry ($I_c$).

(3) Repeat steps 1 and 2 replacing A by the intermediate sum and B by the intermediate carry. After steps 1 and 2 have been repeated N times the intermediate carry is sure to be 0 and the intermediate sum will be the normal arithmetic sum C of A and B. Indeed if after any number of steps it occurs that the intermediate carry is 0, then the intermediate sum at that time will be the normal arithmetic sum C of A and B so that the operations can be stopped as soon as the intermediate carry becomes 0.

An example of the above is as follows:

| | | |
|---|---|---|
| $A=$ | 111 | |
| $B=$ | 101 | |
| | 0010 | ($I_s$) |
| | 1010 | ($I_c$) |
| | 01000 | ($I_s$) |
| | 00100 | ($I_c$) |
| | 001100 | ($I_s$) |
| | 000000 | ($I_c$) |
| | 001100 | True Sum |

The number of operations, each including the formation of an $I_s$ and an $I_c$, necessary to provide the true sum is a maximum of N, where N equals the maximum number of bits in either of the two binary numbers. However, depending upon the numbers, less than N operations may be employed to bring the $I_c$ to 0. Whenever $I_c$ is 0, the true sum is fully developed.

This basic system of this invention finds utility as an adder, subtracter, accumulator, or the like.

In general then, this invention provides a circuit for performing arithmetic operations on N-bit binary numbers comprising means to add corresponding bits of the binary numbers to provide an intermediate sum and means to multiply the corresponding bits to provide an intermediate carry. The intermediate sums and carries of each individual operation are again added and multiplied, the intermediate carry being shifted one higher order position and the operations are continued until the intermediate carry is 0. At this time the arithmetic operation is complete and the true result of the arithmetic operation is developed.

Figure 1:
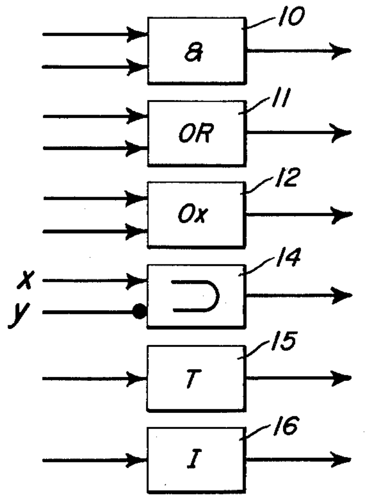
FIGURE 1 is a view showing the various components in diagrammatic form employed in the circuitry of this invention.

Referring first to FIGURE 1, it must be initially noted that each of the components therein shown are of the type having an inherent unit delay, that is, the outputs do not appear until one unit of time after the application of the input signals. Circuitry well known in the art to perform these functions may be employed. For example, the logical core elements shown and described in the co-pending U.S. applications Serial No. 689,827, filed October 14, 1957, in behalf of J. A. Kauffmann (IBM Docket 10,009), and Serial No. 692,131, filed October 24, 1957, in behalf of J. A. Kauffmann (IBM Docket 10,010), may be used. The numeral 10 indicates a 2-input AND gate. The numeral 11 indicates a 2-input OR gate. The numeral 12 indicates an EXCLUSIVE OR gate. This EXCLUSIVE OR gate will provide an output therefrom only if one and only one of the inputs thereto is energized. Numeral 14 indicates an "IF-THEN" gate realizing the function $x$ or $\bar{y}$ ("IF $y$ THEN $x$"). This circuit provides an output therefrom whenever there is an $x$ input thereto or a complement $y$ input thereto or both. Numeral 15 indicates a transfer or delay circuit which provides a unit delay between the input and output. Numeral 16 is an inverter circuit which inverts the input and provides a unit delay between the input and output.

Figure 2:
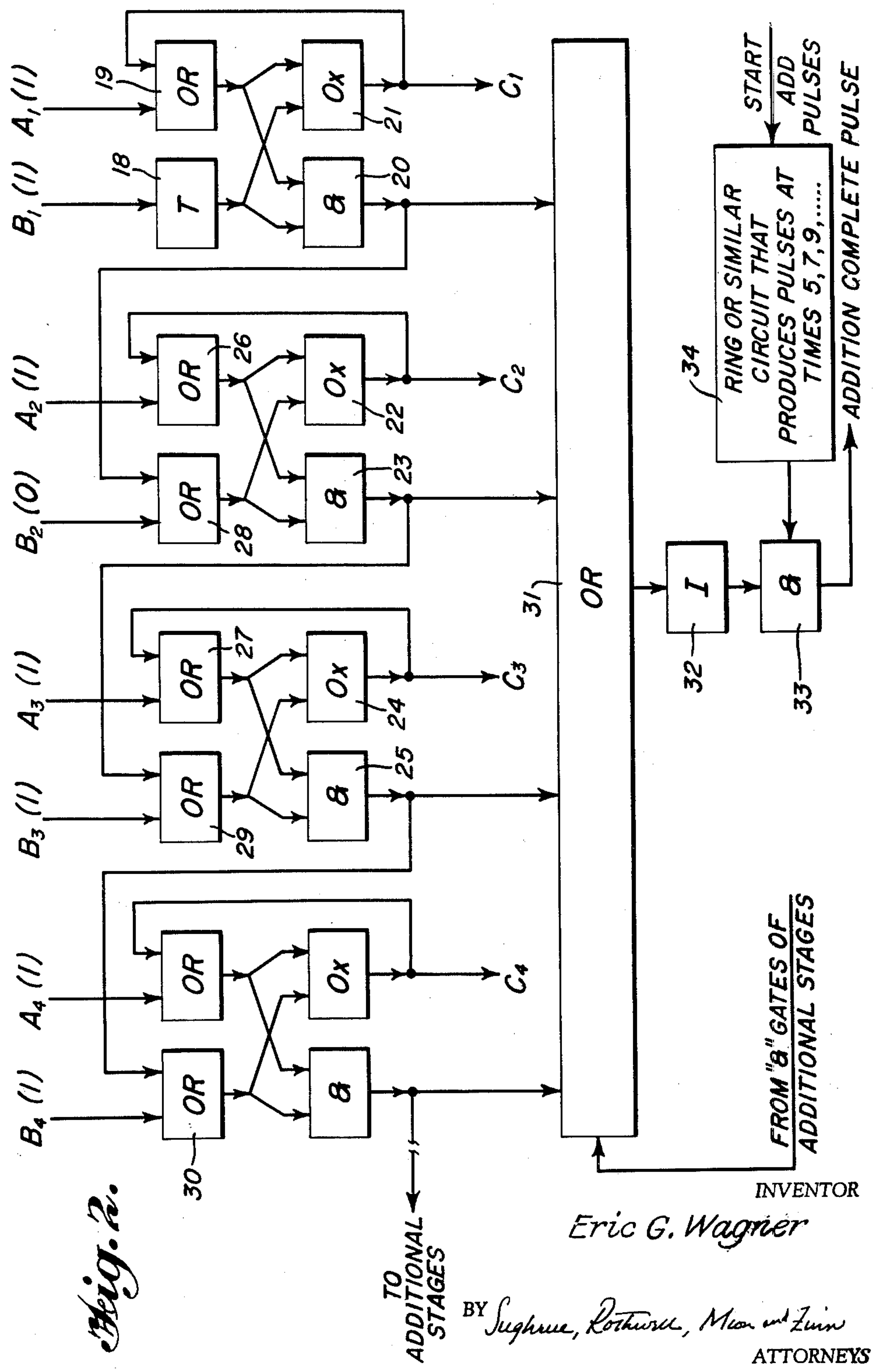
FIGURE 2 is a view showing in diagrammatic form an adder constructed in accordance with this invention.

Referring to FIGURE 2, there is shown an adder having four stages. Let us consider that the two binary numbers A and B are 3-digit numbers ($n=3$). Let us further assume that $A=111$ (decimal 7) and $B=101$ (decimal 5). Both numbers are entered simultaneously on appropriately identified lines. The first stage accommodates $A_1=1$ and $B_1=1$. And let it further be assumed that the entry of these numbers to the adder is made at time 1. At time 2, due to the inherent unit delays of the circuitry, the output of delay 18 is 1 and that of OR 19 is 1. The outputs of 18 and 19 are fed to AND 20 and EXCLUSIVE OR 21. At time 3 the output of AND 20 is 1 and the output of EXCLUSIVE OR 21 is 0. We have then simultaneously developed an intermediate sum of $A_1$ and $B_1$ at the output of EXCLUSIVE OR 21 equal to 0 and an intermediate carry of $A_1$ and $B_1$ at the output of AND 20 equal to 1. By the same logic in stage 2 there is provided at time 3 an intermediate sum of 1 at the output of EXCLUSIVE OR 22 and an intermediate carry of 0 at the output of AND 23. In stage 3 at time 3 we have developed an intermediate sum of 0 at the output of EXCLUSIVE OR 24 and an intermediate carry of 1 at the output of AND 25. The outputs of the EXCLUSIVE OR's are recirculated through their respective OR gates 19, 26, and 27. The outputs of the AND gates are fed one stage to the left to the next higher order to associated OR gates 28, 29, and 30. This provides the 1-position shift to the left of the carry orders. At time 3 the carry orders are processed by each stage except the first to provide outputs therefrom at time 5. At time 5 in the first stage the intermediate sum is 0 and the intermediate carry is 0. In the second stage the intermediate sum is 0 and the intermediate carry is 1. In the third stage the intermediate sum and the intermediate carry are both 0's. In the fourth stage the intermediate sum is 1 and the intermediate carry is 0. At time 7 in the first stage the intermediate sum and intermediate carry are both 0's. In the second stage the intermediate sum and intermediate carry are both 0's. In the third stage the intermediate sum is 1 and the intermediate carry is 0. In the fourth stage the intermediate sum is 1 and the intermediate carry is 0.

Now, since all carries are 0 the sum is fully developed. Each operation, including the formation of an intermediate sum and an intermediate carry, occurs N times and the sum is developed at 2N plus 1 time. In this case, at time 7 the sum is fully developed since N equals 3. The outputs of the EXCLUSIVE OR gates are recirculated. At time 7 all AND gates are 0 and thus at time 8 the output of the OR gate 31 is down. Hence, at time 9 the output of the inverter 32 is up and feeds AND gate 33, but at time 9 unit 34 also feeds AND gate 33 so that the output of AND gate 33 is 1 at time 10 indicating the completion of the carry. Unit 34 consists of some circuit, such as a ring with delayed output, that will produce pulses at times 5, 7, 9, . . . etc. (given that the start add pulse occurs at time 1). Circuitry well known in the art, such as vacuum tube circuitry, may be employed to perform this function. No output occurs from unit 34 until time 5, nor on the even times, in order to avoid spurious indications of addition completed, since, in the circuit as indicated in FIG. 2, the output of inverter 32 will be up until time 4 and at all even times. Elements 31 and 32 need not have an inherent delay, and any type of circuitry may be used here if the timing of unit 34 is adjusted in keeping with it. The addition complete pulse can be used to initiate the readout of the sums from the outputs of the EXCLUSIVE OR gates or to start some other activity within the system in which this accumulator-adder is employed; e.g., to initiate the bringing in of the next instruction in a computer system.

To clear the adder, a negation of the sum may be added thereto or some equivalent technique. In the instant case, core circuits having inherent unit delay are preferably employed as logical units. To clear the core adder a pulse may be applied to a bias coil connected on all the cores.

The circuit of FIGURE 2 may also be employed as an accumulator. In that event all A inputs are removed and the numbers to be accumulated are introduced on the B input lines.

In the circuit of FIGURE 2 as has been stated, the sum of A and B is developed as soon as the carry goes to 0. A third number D may be added to the sum of A plus B, and D may be introduced on the B lines once the sum of A plus B is completed. Additional numbers find the circuit functioning as an accumulator. Of course the readout may be synchronized so as to readout after any particular intermediate sum has been accumulated while permitting said sum to be regenerated without negation.

Figure 3:
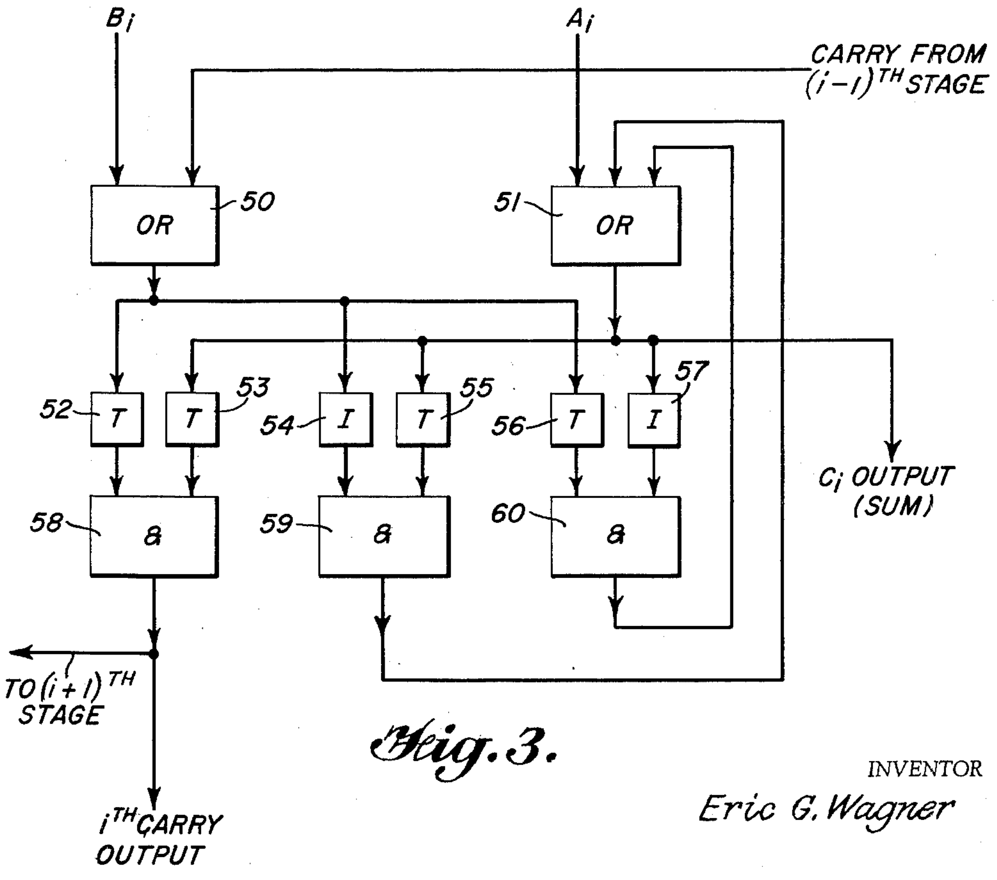
FIGURE 3 is a view showing in diagrammatic form another embodiment of a stage which may be employed in the circuitry of this invention.

Turning to FIGURE 3, there is shown a stage of an adder or accumulator that may be substituted in FIGURE 2. However, this stage operates with a basic cycle of length 3 rather than 2, so unit 34 should be modified to produce pulses at times 6, 9, 12, . . . . It should also be noted that an adder or accumulator using this type of stage will produce partial sums at times 5, 8, 11, . . . and partial carries at times 4, 7, 10, . . . . In this circuit it can be seen that the carry is effectively developed in the same manner as in FIGURE 2, but the sum is developed in a different manner. Let us assume that B*i* equals 1 and A*i* equals 1. At time 1 these bits are introduced to this stage. At time 2 the output of OR gate 50 provides a 1 to transfers 52 and 56 and inverter 54. At time 2 the output of OR gate 51 also provides a 1 to transfers 53 and 55 and inverter 57. Gate 51 also provides a 1 on the sum output, and in an adder-accumulator, this can also be regarded as an intermediate sum if desired. At time 3 the outputs of transfers 52 and 53 provide 1's to AND gate 58 while inverter 54 and transfer 55 provide a 0 and 1, respectively, to AND gate 59, and transfer 56 and inverter 57 provide a 1 and 0, respectively, to AND gate 60. At time 4 AND gate 58 provides a 1 as the intermediate carry from this stage. Also at time 4 AND gates 59 and 60 provide 0's which are fed back as inputs to OR gate 51. At this same time in an adder-accumulator the carry from the preceding stage would be fed to OR gate 50. Thus, at time 5 the output from OR gate 50 would be the carry from the preceding stage and the output of OR gate 51 would be 0, the intermediate sum for this *i*th stage. We are thus in effectively the same situation as at time 2, i.e., both the carry and sum signals are at the second level. If we assume B*i* is 1 and A*i* is 0, it can be seen that the intermediate carry is 0 at time 4 and the output of OR gate 51 provides a sum of 1 at time 5. This is true also for $Bi=0$ and $Ai=1$. And lastly, if $Ai=0$ and $Bi=0$, then the sum and carry will both be 0 at times 5 and 4, respectively, at the outputs of gates 51 and 58, respectively. Although it would be possible to detect the carry signal from the *i*th stage at the output of OR gate 50 in the $i+1$th stage at times 5, 8, 11, . . . this would slow down the "addition-completion" detection.

Given two binary numbers A and B, it is now desired to subtract B from A. This can be done by first complementing each binary bit of B, then adding this 1's complement of the B number ($\overline{B}$) plus a "fugitive 1" to the number A. For example:

```
A=   1 1 0   ≡   A=  1 1 0
B= − 0 1 0       B̄=  1 0 1
                  +  0 0 1   (fugitive 1)
   -------          ------
     1 0 0           1 0 0
```

The "fugitive 1," which is required in the above method may be obtained automatically by a procedure known in the art as "end around carry." A carry bit from the highest binary order is returned to the lowest binary order to be subsequently added to an intermediate sum in order to obtain the time difference. Thus, in the example as given above;

```
A=   1 1 0   ≡   A=   1 1 0
B= − 0 1 0       B̄+   1 0 1
   -------           -------
     1 0 0           1 0 1 1
                     └──→1
                      +
                     -------
                      1 0 0
```

This end around carry is always generated whenever a smaller positive number is being subtracted from a larger positive number. This method may thus be incorporated into the addition algorithm employed by the present invention in the following manner:

```
A=   1 1 0
B̄=   1 0 1
    -------
     0 1 1   (Is)
   1 0 0 1   (Ic—with end around carry)
   └──↑
    -------
     0 1 0   (Is)
   0 0 1 0   (Ic)
   └──↑
    -------
     0 0 0   (Is)
   0 1 0 0   (Ic)
   └──↑
    -------
     1 0 0   (Is)
   0 0 0 0   (Ic)
   └──↑
    -------
     1 0 0   True Difference
```

Figure 4:
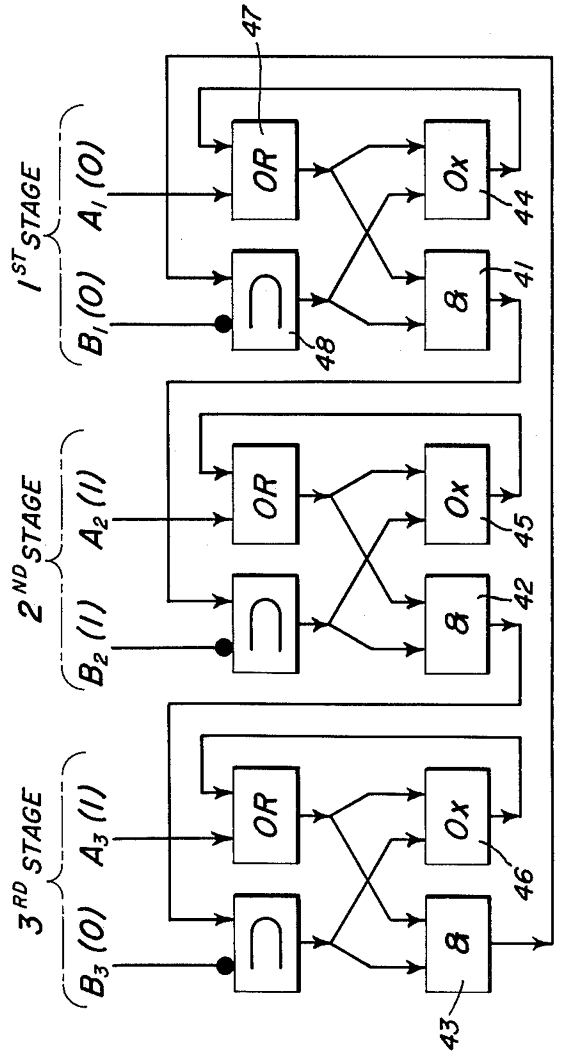
FIGURE 4 is a view showing in diagrammatic form a subtracter constructed in accordance with this invention.

Turning to FIGURE 4, there is shown a subtractor constructed in accordance with this invention. Let us assume that A is equal to 110 (decimal 6) and B is equal to 010 (decimal 2). The circuit of this figure will subtract the second of these two binary numbers to provide a difference of 100 (decimal 4). The number B, equal to 010, is introduced on the B lines. To the first stage is introduced $A_1$ equals 0 and $B_1$ equals 0. Assuming that these digits are introduced at time 1, then at time 2 the output of OR gate 47 is 0 providing a 0 input to gates 41 and 44. At time 2 the output of gate 48 is 1 providing 1 inputs to gates 41 and 44. The output of gate 48 is therefore the complement of $B_1$, or $\overline{B}_1$. It can be seen that the output of gate 44 at time 3 will be 1, constituting an intermediate sum of 1, and the output of gate 41 is 0, constituting an intermediate carry of 0. By the same logic in connection with stage 2 at time 3, there will be provided an intermediate sum of 1 and an intermediate carry of 0, and in stage 3 an intermediate sum of 0 and an intermediate carry of 1. The intermediate carry of 1 from the third stage at the output of AND gate 43 is recirculated to the input to gate 48 in stage 1, and thus constitutes the end around carry. Furthermore, at each stage the sum signals are recirculated to the OR gate to which A was initially fed in, and the carry signal is transmitted to the IF-THEN gate of the next higher order stage. These intermediate sums and carries therefore form a new set of inputs at time 3. Also, beginning at time 3 a "one" signal is applied to all of the B digit input leads to the IF-THEN gates, since any "zero" B digit signals which are found in the original number would otherwise keep these gates up and prevent them from being controlled by the carry signals during the succeeding operations in which $I_s$ and $I_c$ are formed. This function could be performed by a ring circuit similar to that used in the 0 carry detection circuit whose output could be coupled to the B input leads, or it could be performed by any other circuit which would provide a 1 output beginning at time 3 and lasting until the subtraction is completed. At time 5 the outputs occasioned by these inputs are produced and give an intermediate sum 010 and an intermediate carry 001; these in turn are fed back as inputs, with the carry shift, and at time 7 we have an intermediate sum 000 and an intermediate carry 010. Thus, at time 9 we get final true difference 100 and final carry 000. It should be noted that after the first cycle, i.e., after time 3, the operation is exactly the same as that of the adder except that the carry from the last stage is always fed back to the first stage. Also, the 1's complement of the B number ($\overline{B}$) is actually formed within the first level of the subtractor. Obviously, if we replace the IF-THEN circuits with OR gates, this $\overline{B}$ number must be formed outside the subtractor before it could be applied to such OR gates.

What has been shown and described are various embodiments of the present invention. Other embodiments obvious from the teachings herein to those skilled in the art and contemplated to be within the spirit and scope of the accompanying claims.

What is claimed is:

1. A circuit for adding in parallel two binary numbers represented by signals that comprises a plurality of cascaded half-adder stages, each stage having a sum and a carry output, means connecting the carry output from a preceding stage to one input of a next succeeding stage, and means connecting the sum output of a stage to an input of the same stage.

2. An adding circuit as defined in claim 1 further comprising means responsive to all carry outputs being 0 to indicate that the sum outputs represent the true sum of said numbers.

3. A stage in a multi-stage arithmetic device for performing an arithmetic function on two multi-digit binary numbers represented by signals comprising first and second non-EXCLUSIVE OR gates, an AND gate and an EXCLUSIVE OR gate, all of said gates providing a unit time delay between input and output signals associated therewith, means to feed a digit of one of said numbers to said first non-EXCLUSIVE OR gate, means to feed a corresponding digit of the other of said numbers to said second non-EXCLUSIVE OR gate, means to feed the outputs of said non-EXCLUSIVE OR gates to said AND gate and to said EXCLUSIVE OR gate, means to feed the output of the AND gate of the next lower order digit processing stage of said arithmetic device to said first non-EXCLUSIVE OR gate, output means from said EXCLUSIVE OR gate to provide the sum of said digits, means connecting said output means to an input of said second non-EXCLUSIVE OR gate, and output means from said AND gate to provide the carry of said two digits.

4. An adder for adding two multi-digit binary numbers to provide the sum and carry thereof that comprises a plurality of stages as defined by claim 3 connected in cascade, means connecting the output from the highest order stage AND gate to an input of said first non-EXCLUSIVE OR gate in the lowest order stage thereof, and means responsive to the carries of all of said stages being 0 to indicate that the digit sums represent the final result of the arithmetic function.

5. A stage in a multi-stage adder for adding two multi-digit binary numbers represented by signals comprising first and second non-EXCLUSIVE OR gates, first and second and third AND gates, means to feed a digit of one of said numbers to said first non-EXCLUSIVE OR gate, means to feed a corresponding digit of the other of said numbers to said second non-EXCLUSIVE OR gate, means to feed the outputs of said non-EXCLUSIVE OR gates to said first AND gate, means to feed the output of said first non-EXCLUSIVE OR gate to said third AND gate and means to feed the complement of this output to said second AND gate, means to feed the output of said second non-EXCLUSIVE OR gate to said second AND gate and means to feed the complement of this output to said third AND gate, means to feed the output from the first AND gate in a preceding adder stage to said first non-EXCLUSIVE OR gate, means to feed the outputs from said second and third AND gates to said second non-EXCLUSIVE OR gate, output means from said second non-EXCLUSIVE OR gate to provide the sum of said two digits, and output means from said first AND gate to provide the carry of said two digits.

6. A multi-stage adder for adding in parallel two multi-digit binary numbers represented by signals comprising a plurality of cascaded stages, each of said stages comprising first means to multiply corresponding digits of said numbers to provide intermediate carries, second means to add corresponding digits of said numbers to provide intermediate sums, third means to apply an intermediate carry from a preceding stage to said first and second means of the next succeeding stage, fourth means to apply the intermediate sum of each stage to the associated first and second means of said stage, and means responsive to all the intermediate carries being 0 to indicate that the intermediate sums of all the stages represents the final sum of said binary numbers.

7. An adder as defined by claim 6 wherein said first and second means are adapted to provide at least a unit time delay between inputs and outputs associated therewith.

8. An information storage device comprising an OR gate having a unit delay between first and second inputs and an output associated therewith, an EXCLUSIVE OR gate having a unit delay between first and second inputs and an output associated therewith, means connecting said OR gate output and said EXCLUSIVE OR gate first input, means connecting said EXCLUSIVE OR gate output and said OR gate first input, means to apply a signal during a first time to said OR gate second input, and means to apply a signal during a second time to said EXCLUSIVE OR gate second input.

9. A multi-stage adder according to claim 6 in which said third means includes an OR gate.

10. A multi-stage adder according to claim 6 in which said third means includes an IF-THEN gate.

References Cited in the file of this patent

UNITED STATES PATENTS

| | | |
|---|---|---|
| 2,802,953 | Arsenault et al. | Aug. 13, 1957 |
| 2,844,308 | Dussine | July 22, 1958 |
| 2,892,099 | Gray | June 23, 1959 |
| 2,923,475 | Ketchledge | Feb. 2, 1960 |

OTHER REFERENCES

Adders and Accumulators, "Synthesis of Electronic Computers and Control Circuits," Harvard Press, May 17, 1951, pp. 159–162.

Williams et al.: Proceedings of Institute of Elec. Eng., Part II, Vol. 71, April 1952, pages 111–113.